No. 746,821. PATENTED DEC. 15, 1903.
N. GOODYEAR.
ACETYLENE GAS GENERATOR.
APPLICATION FILED SEPT. 10, 1902.
NO MODEL. 4 SHEETS—SHEET 2.
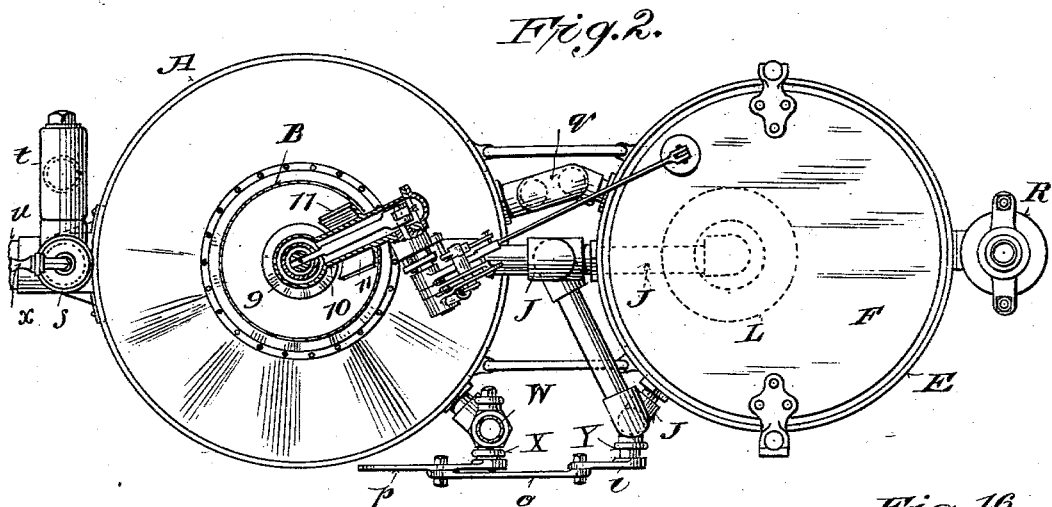
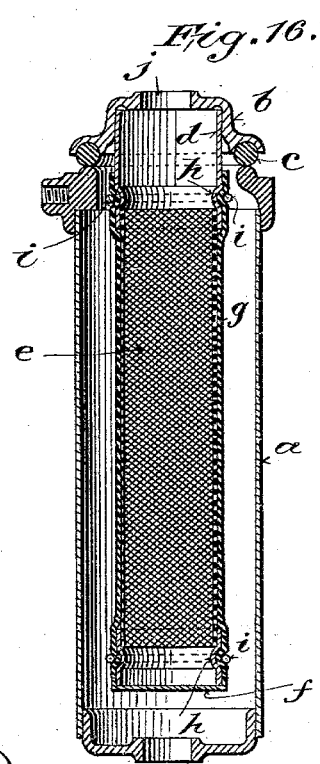
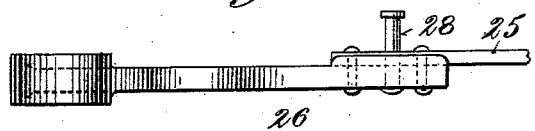
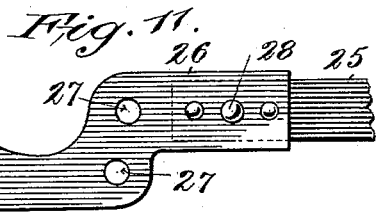
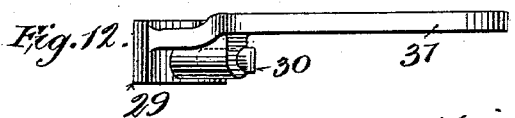
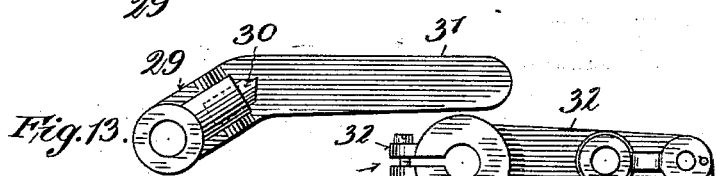
WITNESSES:
INVENTOR
Nelson Goodyear
BY
ATTORNEYS No. 746,821. PATENTED DEC. 15, 1903.
N. GOODYEAR.
ACETYLENE GAS GENERATOR.
APPLICATION FILED SEPT. 10, 1902.
NO MODEL. 4 SHEETS—SHEET 3.
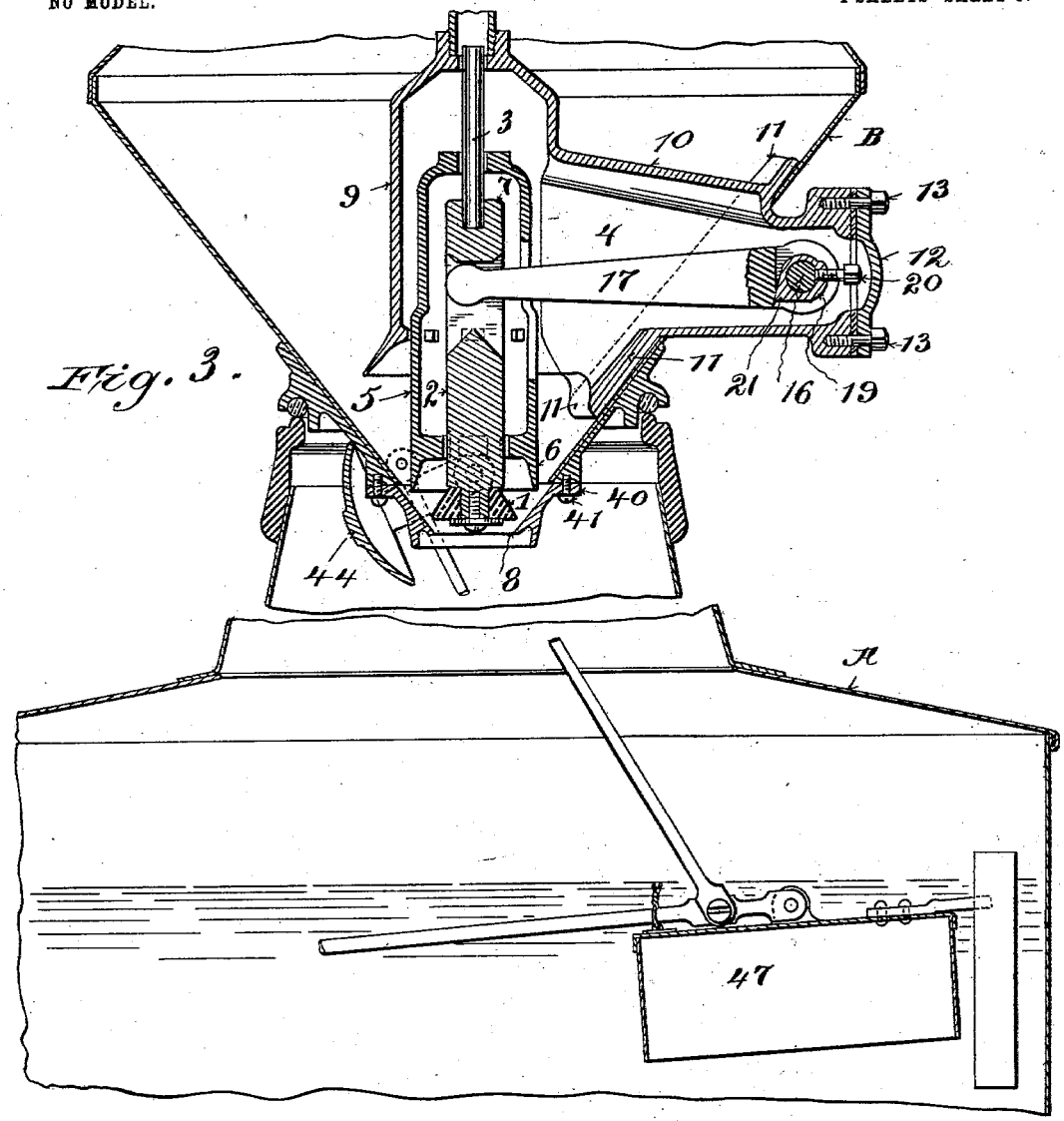
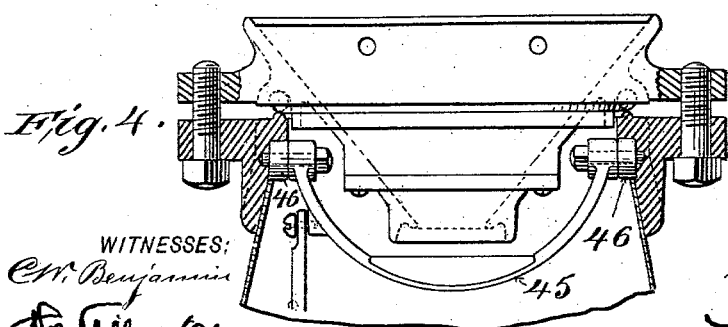
WITNESSES:
INVENTOR
ATTORNEYS

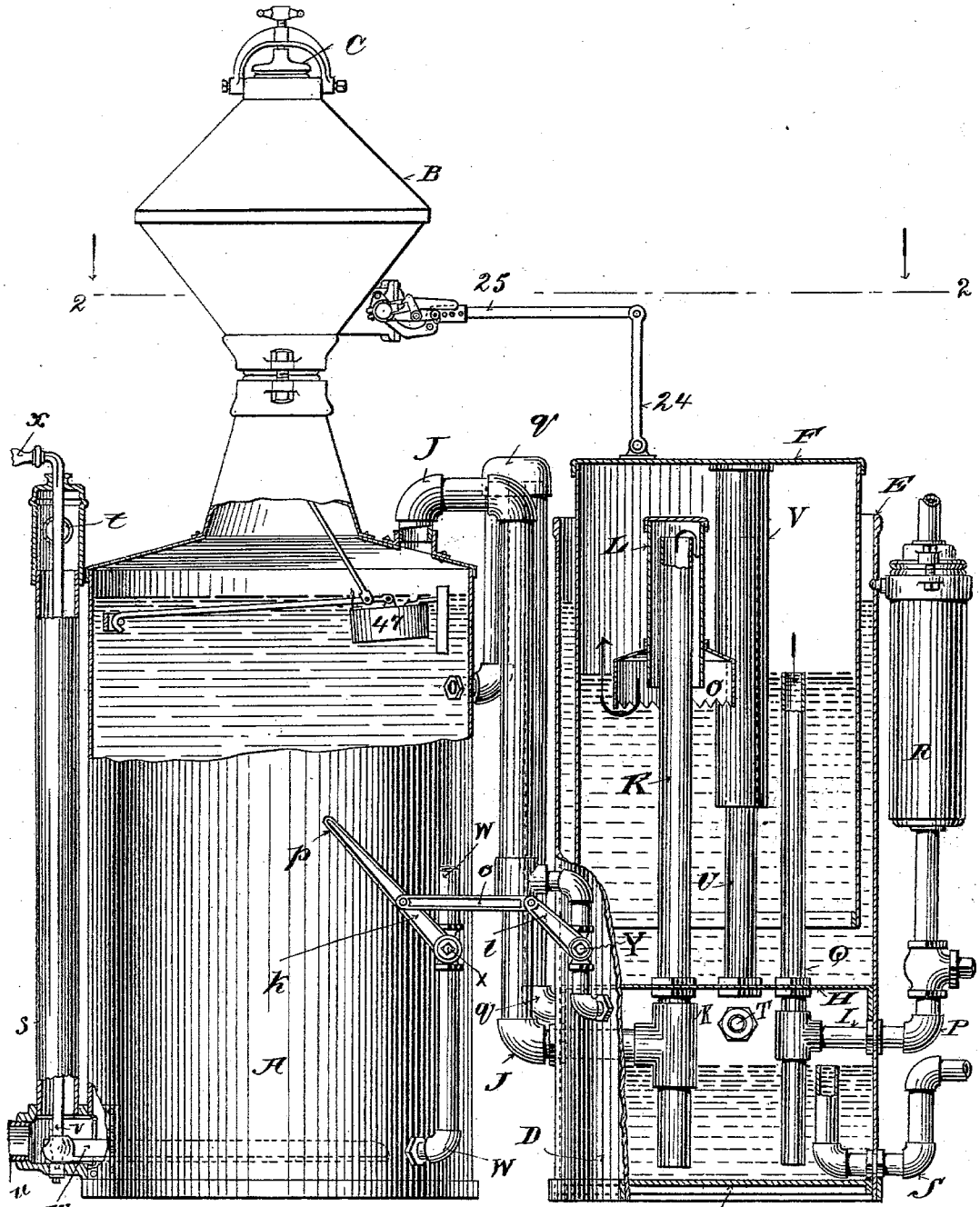

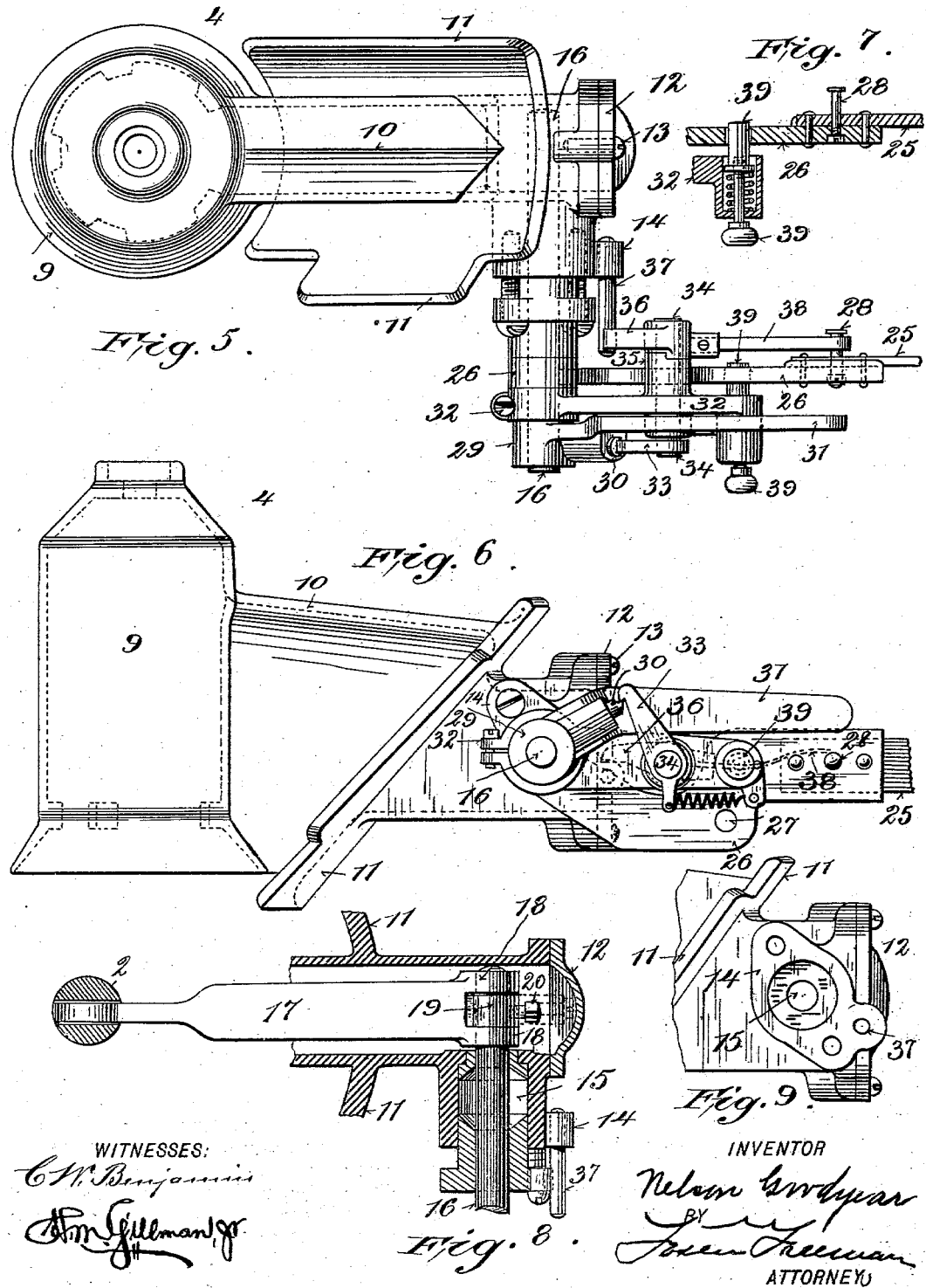

No. 746,821. Patented December 15, 1903.

UNITED STATES PATENT OFFICE.

NELSON GOODYEAR, OF FLUSHING, NEW YORK, ASSIGNOR TO THE J. B. COLT COMPANY, OF NEW YORK, N. Y., A CORPORATION OF NEW JERSEY.

ACETYLENE-GAS GENERATOR.

SPECIFICATION forming part of Letters Patent No. 746,821, dated December 15, 1903.

Application filed September 10, 1902. Serial No. 122,883. (No model.)

*To all whom it may concern:*

Be it known that I, NELSON GOODYEAR, a citizen of the United States, residing at Flushing, Long Island, in the State of New York, have invented certain new and useful Improvements in Acetylene-Generators, of which the following is a specification, accompanied by drawings.

My invention relates to acetylene-generators; and its objects are to improve the construction and operation of such generators and to secure more efficient regulation than heretofore.

Further objects of my invention are to increase the economy of operation of the apparatus with a simplified construction which is not liable to get out of order, and therefore operates with certainty.

Further objects of my invention will hereinafter appear; and to these ends my invention consists in a generator for carrying out the above objects constructed and arranged and having the general mode of operation substantially as hereinafter fully described, and shown in this specification and accompanying drawings, in which—

Figure 1 is a side elevation, partly in longitudinal section, of generating apparatus embodying my invention. Fig. 2 is a plan view of the apparatus, partly in section, on the line 2 2 of Fig. 1. Fig. 3 is an enlarged detailed view of the tank in longitudinal section with a portion of the tank partly broken away. Fig. 4 is an enlarged detail view, partly in section, of a portion of the apparatus shown in Fig. 3. Fig. 5 is an enlarged plan view of the inner casing or casting of the hopper, together with the valve-controlling connections. Fig. 6 is a side elevation of the parts shown in Fig. 5. Fig. 7 is a detail sectional view of one of the spring-catches shown in Figs. 5 and 6. Fig. 8 is a detail view in sectional plan with a portion of the inner casting of the hopper broken away and showing the stuffing-box for the rock-shaft controlling a carbid-valve. Fig. 9 is a detail view, in side elevation, of a portion of the end of the inner casting of the hopper. Figs. 10 to 15, inclusive, are detail views of the carbid-valve-controlling mechanism before assemblage in the apparatus; and Fig. 16 is an enlarged longitudinal sectional view of the filter shown in Fig. 1.

Referring to the drawings, a water-holding vessel A is provided with a suitable hopper B and cover C, while connections are provided leading from the generating-chamber of the vessel A to the gasometer D, which, as shown in this instance, consists of the outer stationary vessel E and the rising and falling bell F. According to my construction the improved operative connections are provided between a moving part of the mechanism, as the rising and falling bell F, and the valve-controlling mechanism of the carbid-valve within the hopper B, whereby said carbid-valve is controlled by the volume of gas and the movements of the bell.

The gasometer D, as shown, is provided with a double bottom, formed by the bottom G of the stationary vessel E and the second or inner bottom or dividing wall H, which divides the vessel E into two compartments, within the upper compartment of which the bell F rises and falls, while the lower compartment I is partially filled with water and forms a combined drain-trap and water seal for the pipes extending downward into said chamber.

Suitable piping J leads from the vessel A to the lower chamber I of the gasometer and connects within the same with a pipe K, the lower end of which is water-sealed, while the upper portion extends through the second bottom H upwardly above the level of the water within the bell. Surrounding the upper end of the pipe K is a floating trap L, which should be so weighted that its sealing-flange O extends down into the water within the gasometer, so that the gas in passing from the pipe K into the gasometer will have to break the seal in passing under the flange O. Consequently the gas-pressure in the gasometer will be correspondingly less than in the generating-chamber. When for any reason the gas-pressure in the generating-chamber is reduced, the trap L sinks and prevents the backflow of gas from the gasometer to the generating-chamber.

The gas-educting pipe P leads from the chamber I, within which it connects with the pipe Q, communicating with the gasometer, the lower end of said pipe Q being water-sealed in the chamber I. It will thus be seen that the chamber I forms a drain-trap for the piping of the gasometer and also for the gas-educting pipe, which latter pipe passes, as shown, to a filtering apparatus R. (Shown in detail in Fig. 16.) The filter consists of an outer casing $a$, provided with a cover $b$, suitably connected to the main casing of the filter and, as shown, having a washer $c$ interposed between the casing and the cover to make a gas-tight connection. In this instance connected to the cover $b$ is a depending sleeve $d$, which supports a substantially cylindrical netting or wire framework $e$, provided at its lower end with the metallic cap $f$. Means are provided for securing a sheet of felt $g$ or other suitable filtering material over the cylindrical netting $e$, and in this instance the depending collar $d$ and cap $f$ are provided with circular depressions $h$, so that the ends of the felt cloth may be tied therein by means of the cords $i$, and thus secured in position. The aperture $j$ in the cap $b$ is adapted for the connection of piping leading from the filter to the apparatus for the utilization of acetylene gas. This construction of filter has been found to operate in an efficient and satisfactory manner, and owing to its simple construction it will be seen that the parts may be readily removed and a clean filter-cloth substituted, when desired, while by removing the cloth the cylindrical netting may be readily cleaned.

A suitable overflow-pipe S, shown as U-shaped, is provided for the lower chamber I, while the aperture T in the wall of said chamber leads to the atmosphere.

A suitable telescopic blow-off is provided for the gasometer, comprising the upwardly-extending pipe U, leading to the chamber I and the gasometer, and having a telescopic portion V, which rises and falls with the gas-bell F.

A water-supply pipe W is shown as communicating with the water vessel A and adapted to be connected to a source of water-supply for filling the tank A, and a suitable valve X is arranged in said pipe W for controlling the supply of water to the vessel. When water is being supplied to the vessel A, means are provided for the outlet of air, in this instance a vent-cock Y or air-outlet being provided in a portion of the piping leading from the vessel A to the gasometer. Levers $k$ and $l$ are connected to operate the cocks X and Y and connected to each other by a link $o$, so that by moving the handle $p$ the cocks X and Y will be operated together. According to this arrangement when it is desired to fill the vessel A with water it will be seen that upon throwing the handle $p$ to open the water-cock X the vent-cock Y for the outlet of air will also be opened and when the water-cock X is closed the vent-cock Y will be closed. Piping $q$, as shown, is connected from a point normally beneath the water-level of the vessel A to the chamber I for regulating purposes, and the whole construction and arrangement of the apparatus as described has been found to be simple and efficient in operation and economical and satisfactory.

The water vessel A is provided with an overflow-pipe $s$, which rises from the level of the bottom of the vessel and is provided with an overflow-opening $t$ and a flush-out cock $u$. This overflow-pipe is utilized as a water seal for the shaft $v$ of the stirring mechanism, shown as comprising a stirrer-blade $w$, adapted to be swept over the bottom of the vessel A and operated from the handle $x$ at the top of the overflow-pipe $s$.

As hereinbefore stated, operative connections are provided between the rising and falling bell F and the carbid-valve within the carbid-hopper B. This valve preferably consists of several parts and comprises the valve 1, suitably secured to the plunger 2, connected to the valve-rod 3, adapted to rise and fall within the upper portion of the inner casing or casting 4. Arranged outside of the plunger 2 is a casing 5, loosely guided on the valve-rod 3 and movable relatively to the valve 1, the lower end of said casing 5 being adapted to seat over the valve 1 when it is closed. As the plunger 2 is raised the top 7 thereof carries the casing 5 upwardly, and according to the construction shown the valve 1 will always be moved from its seat 8 before the casing 5 is raised, and as the valve is closed it will be seen that the casing 5 will first seat itself on the hopper and then the valve 1 will be closed. The casing 5 serves as an outer protecting-cover for the valve 1 and plunger 2, so that the movements of said valve are not interfered with by the carbid.

For the proper mounting and protection of the valves I provide a separate casting 4. (Shown in longitudinal section in Fig. 3 and as enlarged detail views in Figs. 5 and 6.) This casting is also shown in Fig. 2 in horizontal section, and it will be seen that it comprises, essentially, a bell-shaped portion 9, within which the carbid-valve is adapted to move, and connected thereto and forming a part of the casting is a narrower portion or neck 10, provided with cheeks or flanges 11, having a conical surface for fitting and securing the casting 4 to the hopper. The neck 10 extends beyond the flanges 11, as shown in the drawings, and is provided with a removable cap 12, suitably secured to the casting 4, as by means of bolts 13. By this construction I produce a universal or interchangeable casting for valve mechanism which will fit equally with all sizes of hopper so long only as the angle of convergence of the conical bottoms of the hoppers remains constant. The flanges 11 are formed at an angle or incline to the vertical corresponding with the inclination of the hopper-wall. In fixing the casting in position within the hopper the neck portion provided with the cap 12 is thrust through a suitable opening in the wall of the hopper and then the flanges 11 secured to the hopper-walls in any suitable manner to fix the casting in position.

The side of the end or neck 10 of the casting 4 is provided with a lateral projection 14, as shown in Fig. 9, having an aperture 15 for the insertion of a rock-shaft 16 transversely through the end of the casting, its interior forming a suitable stuffing-box through which the rock-shaft 16 passes to form a tight connection. An arm 17 is loose upon the rock-shaft 16 and at its outer end engages the plunger 2 of valve 1, lost motion being provided for between the end of the arm 17 and said plunger. The end of arm 17 connected to the shaft 16 is in this instance forked, while preferably arranged between the forks 18 is a collar 19, adapted to be readily secured to the shaft 16, as by means of a set-screw 20. This collar 19 is provided with a bearing-tip 21, adapted to bear upon the bottom of the arm 17, so that when the shaft 16 is rocked in a direction to carry the arm 17 upwardly the collar 19 will bear against the arm 17 and actuate it in an upward direction. When the shaft 16 is rocked in the opposite direction, it will be seen that the arm 17 will not be positively actuated by movements of the rock-shaft, the weight of the carbid-valve and assembled parts then being depended upon to close the valve, the arm 17 being itself preferably of considerable weight to aid in its downward movement by its own gravity. By this arrangement the parts are not apt to get out of order and become broken by reason of lumps of carbid sticking beneath the valve and its appurtenant parts. Although the angular travel of the arm 17 is limited according to my construction, the angular motion of the arm 25 and the free travel of the bell are not limited, so that the valve and valve mechanism as a whole may be used with gasometers of varying size and bell travel.

Connected to the gas-bell F is a rod 24, loosely pivoted to which is an arm 25, connected to a member 26, loose upon the shaft 16. This member 26 is provided with adjusting-holes 27 and a lug 28, the purposes of which will hereinafter appear. Fixedly secured to move with the shaft 16 is a member 29, provided with an upwardly-extending catch 30 and a finger 31. Also loosely secured upon the shaft 16 is a third member 32, provided with a latch 33, pivoted therein and adapted to coöperate with the catch 30. The latch 33 is provided with a shaft 34, extending through the boss 35 of the member 32 and provided at the end opposite to the latch with a trip 36, adapted to impinge upon a stop 37, connected to the flange 14. A spring 38 normally tends to hold the latch 33 in one position, and the member 32 is adapted to be connected to move with the member 26 by suitable means, in this instance the member 32 being provided with a spring-pressed pin 39, adapted to the apertures 27 in the member 26, whereby the member 32 may be connected in different positions to the member 26.

The operation of the valve-controlling mechanism is substantially as follows: Assuming the gas-bell F to be in its uppermost position, should the volume of gas decrease, requiring the supply of more carbid to the generating vessel, it will be seen that as the arm 25 moves downwardly the latch 33, which is normally engaged with the catch 30, will rock the shaft 16 in a direction to move the arm 17 upwardly and open the carbid-valve, and according to the construction described efficient automatic regulation takes place. It will be seen that the finger 31 extends outwardly over the bosses of the member 32, which is fixed to the movable member 26, and as the arm 25 is moved upwardly the bosses of member 32 will bear upon the under side of finger 31, and thus rock the shaft 16 in an opposite direction to that in which it was rocked when arm 25 moved downward. By this construction positive rotation of the rock-shaft in both directions is provided, and the possibility of the valve being held open by a sticking of the rock-shaft in its bearings or stuffing-box is avoided, because the friction between the parts tends to cause instead of to resist the proper motion of the valve. According to my construction when the carbid is used up and the arm 25 moves downward beyond a predetermined limit the trip 36 strikes against stop 37 and throws the latch 33 from engagement with the catch 30, allowing the valve to close independently of the further motion of the gasometer. When the generator is again charged, the finger 31 may be used as a handle to operate manually the valve to start the machine. The resulting rise of the gasometer at once brings up the arm 25 till the member 32 strikes and raises the finger 31, positively closing the valve and incidentally reëngaging the latch 33 and catch 30. The feeding of the carbid by hand is thus prevented after the machine has started and the bell has risen high enough to permit the valve to close.

As shown more particularly in Fig. 3, the lower opening of the hopper B is provided with a removable valve-seat 40, suitably secured to the hopper, as by means of the screws 41, so that by removing the valve-seat or cap 40 and also the cap 12 from the casting 4 it will be seen that the carbid-valve and arm 17 may be removed from the apparatus, the rock-shaft 16 and its appurtenances having first been removed to allow the removal of the arm 17. By this construction the feeding mechanism of the generator may be readily assembled and disconnected, as desired. A suitable valve or cover 45 is pivoted, as at the points 46, to swing beneath the hopper-opening and shut off the supply of carbid at a predetermined time. The cover 45 is normally in the position shown in Fig. 3 and connections are provided between said cover and a suitable float 47, whereby when the level of the water falls beyond a predetermined amount the cover 45 will close the mouth of the hopper and prevent the feeding of carbid.

It will thus be seen that according to my invention an improved apparatus is provided wherein efficient and economical generation of acetylene gas may be secured with simplicity and interchangeability of parts. The parts may be readily assembled and disconnected. The whole apparatus is compact and simple in construction. It is not liable to get out of order, and should any part become broken it may be readily replaced. Efficient drainage for the gasometer is provided by means of the construction of the double bottom and water seals described, and certainty of regulation of the feeding mechanism is secured by means of the arrangement of operative connection between the gasometer and carbid-valve.

It will be seen that in the construction of my improved filter there is an outer casing and an inner foraminous member, shown in this instance as a wire-netting in the form of a cylinder, while the filter-cloth is secured upon this foraminous member.

According to my construction the feed-valve of the generator, together with the arm or lever for actuating the same, are moved in one direction by the action of gravity, while mechanism is provided for moving said feed-valve and operating-lever in the opposite direction positively. Positive means are provided for actuating the rock-shaft within the casing 4 in both directions, and any suitable means may be provided for actuating said rock-shaft, I having in this instance shown said mechanism connected to be operated by means of the gas generated.

I understand that claims to the gasometer and claims to the gas-filter are not proper subjects-matter for claims in this application. I therefore reserve the right to make separate applications for the gasometer and the gas-filter.

Obviously some features of my invention may be used without others, and my invention may be embodied in widely-varying forms.

Therefore, without limiting myself to the construction shown and described nor enumerating equivalents, I claim, and desire to obtain by Letters Patent, the following:

1. In a feeding mechanism for a generator, the combination of a rock-shaft and positive means for actuating the same in both directions, a feed-valve, connections between the feed-valve and the rock-shaft whereby said valve is operated in one direction only from the rock-shaft, and means for disengaging the connections for operating the rock-shaft in one direction, when the actuating means have reached a predetermined position, substantially as set forth.

2. In a feeding mechanism for a generator, the combination of a feed-valve operated by gravity in one direction, a lever connected thereto for actuating said feed-valve in the other direction, operating mechanism and means for connecting said mechanism to move said lever against gravity, automatic means for disconnecting said mechanism at a predetermined point in the movement of said lever, and means for actuating said mechanism to allow the lever to move with the feed-valve by gravity, substantially as set forth.

3. In a feeding mechanism for a generator, the combination of a rock-shaft, a feed-valve, a lever loose upon said rock-shaft and connected to move with the feed-valve, means for moving said lever with the shaft, a second lever loose upon the shaft and connected to be operated by the gas generated, operative connections between the rock-shaft and second lever, means for disengaging said connections when the second lever reaches a predetermined position in its downward movement, and means for positively actuating said rock-shaft during the upward movement of said second lever, substantially as set forth.

4. In a feeding mechanism for a generator, the combination of a feed-valve, a rock-shaft and a lever connected thereto for moving the feed-valve in one direction, a second actuating-lever, operative connections between the rock-shaft and second lever for rocking said shaft in both directions, and automatic means for disengaging the connections for rocking the shaft in one direction when the second lever reaches a predetermined position, substantially as set forth.

5. In a feeding mechanism for a generator, the combination of a feed-valve, a rock-shaft, an actuating-lever extending to the said feed-valve and loosely arranged upon said rock-shaft, said lever connected to be actuated by said shaft, a second lever loose upon said shaft and connected to be operated by the gas generated, operative connections between the rock-shaft and second lever, a stop for disengaging said connections when the second lever reaches a predetermined position in its downward movement, a means for keeping said connections in operative relations, and connections for positively actuating said rock-shaft in a direction to close the feed-valve at a predetermined position in the upward movement of said second lever, substantially as set forth.

6. In a feeding mechanism for a generator, the combination of a feed-valve, a lever connected to actuate said valve in one direction, a rock-shaft for said lever, a second lever and means for actuating the same, operative connections between said rock-shaft and the second lever, automatic means for disengaging said connections when the second lever reaches a predetermined position in its movement, and means for positively actuating said rock-shaft in the opposite direction as the second lever moves in a reverse direction to its first movement, substantially as set forth.

7. A casing for the hopper of an acetylene-generator, said casing comprising a bell-shaped casing or housing and a narrower neck provided with flanges adapted to be secured to the hopper whereby the casing may protect the feeding mechanism from the carbid, substantially as set forth.

8. A casing for the feeding mechanism of a gas-generator comprising an enlarged portion and a narrower neck provided with flanges for securing the casing to the inner wall of the hopper of the generator, and an opening in the end of the neck covered by a removable cap, substantially as set forth.

9. In a gas-generating apparatus, a casing for the hopper of the generator adapted to fit within different-sized hoppers and comprising a neck and an enlarged portion, with flanges on the neck for securing the casing within the hopper, whereby the feeding mechanism may be protected, and bearings in said casing for the operative parts of the feeding mechanism, substantially as set forth.

10. In a gas-generating apparatus, the combination of a hopper having an aperture in the side thereof, a casing secured to the side of the hopper and provided with a neck extending through said aperture, bearings in said casing for a rock-shaft, a rock-shaft therein, feeding mechanism within the casing, and means for actuating said feeding mechanism, substantially as set forth.

11. In an acetylene-gas-generating apparatus, the combination of a hopper, a casing connected thereto, feeding mechanism within the casing, a rock-shaft supported in the casing and extending through a stuffing-box, a lever connected to said rock-shaft and adapted to move with the feeding mechanism, and mechanism for positively actuating said rock-shaft in both directions, substantially as set forth.

12. In a gas-generating apparatus, the combination with a hopper, of a casing therein, feeding mechanism in said casing, said casing being provided with a neck having an opening at the end thereof closed by a removable cover, and a removable bottom for the hopper provided with a valve-seat, substantially as set forth.

13. In a feeding mechanism for a generator, the combination of a feed device, a lever connected thereto for actuating said device in one direction, operating mechanism for said lever, means for disconnecting said operating mechanism at a predetermined point in the movement of the lever, and means for positively actuating said operating mechanism to permit the feed device to move, whereby the tendency to stick is eliminated at said feed device, substantially as set forth.

14. The combination of a carbid-feeding device, actuating parts for opening and closing the device, and a lost-motion connection for permitting movement of the actuating parts beyond the position for completely closing the said feeding device, the friction of said lost-motion connections tending to actuate the feeding device whereby the tendency to stick is eliminated at the said lost-motion connections, substantially as described.

15. The combination of a carbid-hopper having walls converging downward, a feeding-mechanism casing having correspondingly-inclined securing-flanges and provided with means for mounting, guiding, and protecting the feeding mechanism in coöperative relation to the hopper, substantially as described.

16. The combination with the hopper, the feeding mechanism and the passage-way through which the material is fed, of means additional to the feeding mechanism for stopping the feeding of the material when the water falls, and connections for permitting the material to be fed when the water rises, substantially as described.

17. The combination with the hopper, the feeding mechanism and the passage-way through which the material is fed, of means additional to the feeding mechanism for controlling the feeding of the material actuated both to open and close in accordance with the rise and fall of the water, substantially as described.

18. The combination with the hopper, the feeding mechanism and the passage-way through which the material is fed, of a safety valve or stop mounted to swing under the hopper and cut off the feeding of the carbid, a float, and connections between said valve and the float for actuating said valve in both directions in accordance with the movements of the float, substantially as described.

19. The combination of a carbid-chamber having a converging lower portion and discharge-opening, a valve or stop for the discharge-opening, and a casing for the said valve or stop having a portion adapted to the slant of the said converging portion of the carbid-chamber, whereby the same support is adapted to be used with all sizes of carbid-chambers which have similar shape.

In testimony whereof I have signed this specification in the presence of two subscribing witnesses.

NELSON GOODYEAR.

Witnesses:
E. VAN ZANDT,
HENRY C. GARRETSON.